(12) United States Patent
Infanger et al.

(10) Patent No.: US 10,376,954 B2
(45) Date of Patent: Aug. 13, 2019

(54) METHOD AND DEVICE FOR AUTOMATIC REPLACEMENT OF A DISCHARGE SHELL ON A SLIDING CLOSURE OF A METALLURGICAL VESSEL

(71) Applicant: Refractory Intellectual Property GmbH & Co. KG, Vienna (AT)

(72) Inventors: Ivo Infanger, Hochdorf (CH); Bruno Hugener, Baar (CH)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 666 days.

(21) Appl. No.: 14/904,319

(22) PCT Filed: May 7, 2014

(86) PCT No.: PCT/EP2014/059353
§ 371 (c)(1),
(2) Date: Jan. 11, 2016

(87) PCT Pub. No.: WO2015/003829
PCT Pub. Date: Jan. 15, 2015

(65) Prior Publication Data
US 2016/0167127 A1     Jun. 16, 2016

(30) Foreign Application Priority Data
Jul. 11, 2013   (CH) .................................... 1249/13

(51) Int. Cl.
*B22D 41/22*     (2006.01)
*B22D 41/56*     (2006.01)
(Continued)

(52) U.S. Cl.
CPC ............. *B22D 41/56* (2013.01); *B22D 41/22* (2013.01); *B23P 6/00* (2013.01); *B23P 19/04* (2013.01)

(58) Field of Classification Search
CPC .......... B22D 41/56; B22D 41/22; B23P 19/04; B23P 6/00; B25B 23/10; B25B 13/5083
See application file for complete search history.

(56) References Cited

U.S. PATENT DOCUMENTS

| 4,359,815 A | 11/1982 | Toyoda |
| 4,385,715 A | 5/1983 | Meier et al. |

(Continued)

FOREIGN PATENT DOCUMENTS

| DE | 102009050216 A1 | 12/2010 |
| EP | 2056983 B1 | 5/2009 |

(Continued)

OTHER PUBLICATIONS

Abstract of JP H6-25470.
(Continued)

*Primary Examiner* — Jacob J Cigna
*Assistant Examiner* — Lee A Holly
(74) *Attorney, Agent, or Firm* — Brian Roffe

(57) ABSTRACT

Method for automatically replacing the spout nozzle of a slide closure with a robot for manipulating the slide closure with an appropriate apparatus, the spout nozzle being able to be clamped against the slide plate of the slide closure by a carrying ring that can be released by turning. During the changing procedure, the carrying ring is turned with a defined torque, by means of which the new spout nozzle is clamped with a likewise defined tension force against the slide plate. In this way, operational reliability of the slide closure is guaranteed, independently of any tolerance and other deviations. The apparatus for implementing the method includes a gripping lance with clamping jaws for manipulating the spout nozzle and a gripping ring with catches for manipulating the carrying ring. The gripping ring (Continued)

can be actuated by a hydraulic rotation cylinder. A pneumatic cylinder is used to actuate the gripping lance.

16 Claims, 5 Drawing Sheets

(51) Int. Cl.
    *B23P 19/04*      (2006.01)
    *B23P 6/00*      (2006.01)

(56) References Cited

U.S. PATENT DOCUMENTS

| | | |
|---|---|---|
| 4,685,850 A | 8/1987 | Ohta et al. |
| 5,133,534 A | 7/1992 | Gortan et al. |
| 5,645,793 A | 7/1997 | Yamamoto et al. |
| 5,925,312 A | 7/1999 | Lin et al. |
| 6,045,015 A | 4/2000 | Wattenspuhl et al. |
| 6,221,313 B1 | 4/2001 | Hall |
| 6,663,825 B2 | 12/2003 | Grant, Jr. et al. |
| 8,498,740 B2 | 7/2013 | Truttmann |
| 8,511,730 B2 * | 8/2013 | Goudy ................ B65G 47/908 294/195 |
| 9,085,029 B2 | 7/2015 | Truttman et al. |
| 2003/0010160 A1 * | 1/2003 | Dugan ................ B25B 13/5083 81/446 |
| 2010/0017027 A1 * | 1/2010 | Truttmann ............ B22D 41/22 700/245 |
| 2014/0352122 A1 | 12/2014 | Moors et al. |

FOREIGN PATENT DOCUMENTS

| | | |
|---|---|---|
| EP | 2435201 B1 | 3/2014 |
| EP | 3019293 B1 | 8/2017 |
| JP | H05223469 A | 8/1993 |
| JP | H6-9720 A | 1/1994 |
| JP | H6-254670 A | 9/1994 |
| WO | 2008025562 A1 | 3/2008 |
| WO | 2010136159 A1 | 12/2010 |
| WO | 2015003829 A1 | 1/2015 |

OTHER PUBLICATIONS

English-language translation of Office Action issued by Japanese Patent Office for Japanese patent application No. 2016-524710 dated May 22, 2018.

* cited by examiner

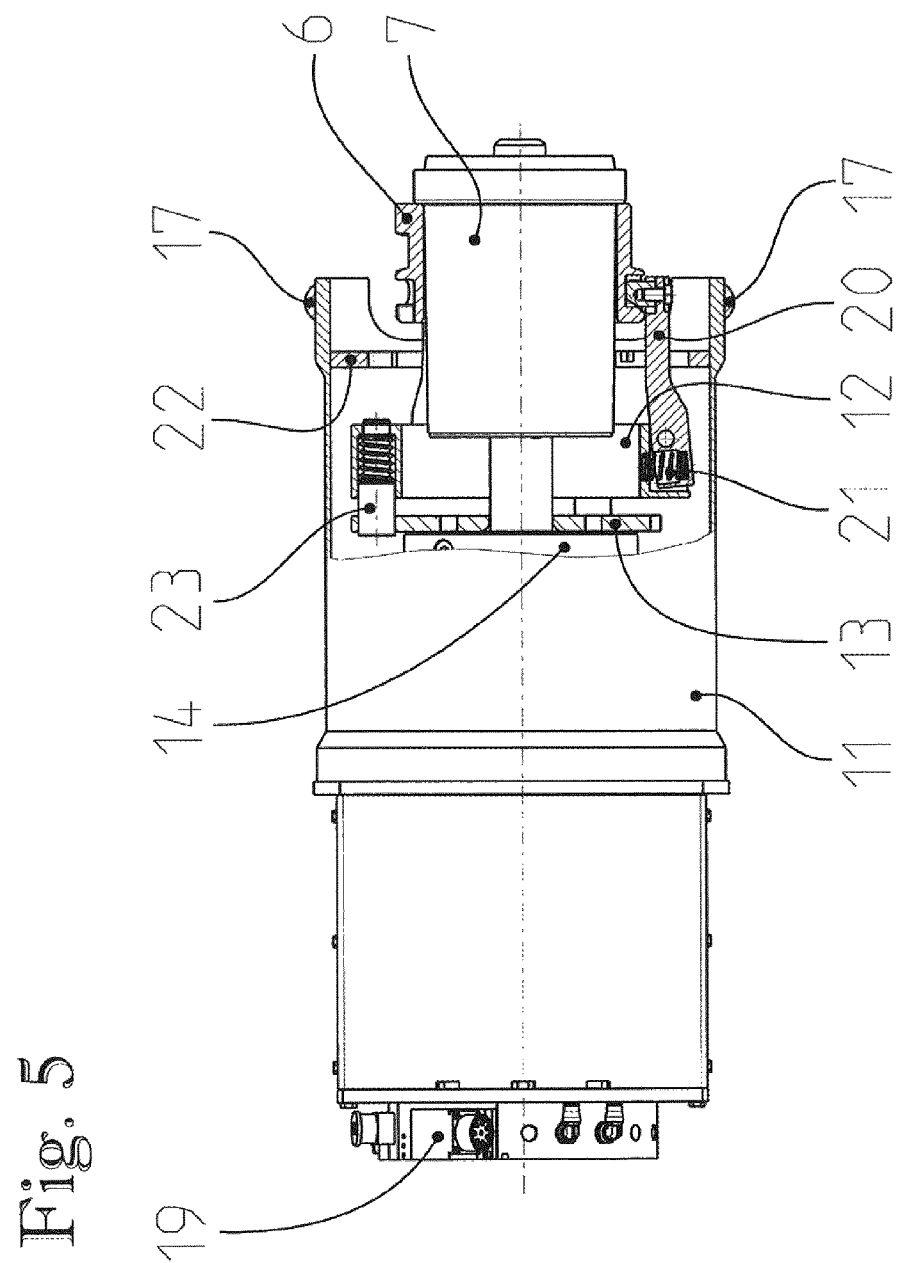

METHOD AND DEVICE FOR AUTOMATIC REPLACEMENT OF A DISCHARGE SHELL ON A SLIDING CLOSURE OF A METALLURGICAL VESSEL

FIELD OF THE INVENTION

The invention relates to an apparatus for automatically replacing a spout nozzle on a slide closure of a metallurgical vessel in a maintenance station with a robot for manipulating the slide closure with appropriate tools, the spout nozzle being held against the slide plate of the slide closure by a carrying ring that can be released by turning.

BACKGROUND OF THE INVENTION

A slide closure of this type is described in more detail for example in EP 2 056 983. It basically consists of a closure plate resting against a sleeve of the vessel and a slide plate that can be displaced relative to the latter and against which the spout nozzle is pressed by means of the carrying ring. The aforementioned components of the slide closure are known to be parts made of refractory materials which are subject to a large degree of wear in casting operation. They must therefore be monitored regularly and be replaced if necessary.

In modern continuous casting plants, the maintenance and servicing work taking place here has lately been carried out automatically in a maintenance station of the plant by a robot installed here. From time to time, the emptied vessels, for example steel ladles, are brought to the maintenance station together with the slide closure fastened to these vessels, and here in particular, the refractory wearing parts are monitored, cleaned and if necessary replaced by new replacement parts.

This work is carried out by the robot that is surrounded here by, among other things, a tool magazine, a stock of replacement parts, a cementing station, a waste container and one or more repositories or intermediate repositories with connection points for electricity, compressed air, oxygen, hydraulic oil etc. The robot automatically carries out the maintenance and servicing work with the aid of appropriate tools which it takes from the tool magazine in each individual case.

OBJECTS AND SUMMARY OF THE INVENTION

The object underlying the invention is to devise a method for automatically replacing the spout nozzle of slide closures which guarantees perfect operational reliability of the slide closure in the region of the spout nozzle after the change.

This object is achieved by the invention in that during the changing procedure the carrying ring is turned with a defined torque, by means of which the new spout nozzle is clamped against the slide plate of the slide closure with a tension force which is likewise defined.

In this way, it is ensured that the new spout nozzle is always fitted such as to be operationally reliable when changed, independently of any dimensional tolerances and other changeable factors, such as, for example, the degree of cementing or the presence of slight impurities.

In order to facilitate the work of the robot, the invention makes provision, moreover, such that it manipulates the spout nozzle and the carrying ring independently of one another during the changing procedure. In this way, the robot can convey the two components separately from one another within the maintenance station by, for example, the carrying ring being positioned first of all, the worn out spout nozzle then being disposed of in a container, and then a new nozzle being fetched from the stock of spare parts and being cemented in a cementing station.

The apparatus for carrying out the method is characterized in that it is provided with means for fitting and removing the carrying ring which are made up of a gripping ring with carrying ring catches and a hydraulic rotation cylinder for turning the gripping ring. The effect of the precisely controllable rotation cylinder is that during the changing procedure, the catches of the gripping ring can turn the carrying ring with a precisely defined torque. Thus, the carrying ring can be clamped with a tension force which is likewise precisely defined.

According to the invention, the changing apparatus is also equipped with means for fitting or removing the spout nozzle in the form of a gripping lance that can be retracted and extended with grippers that can be retracted and extended pneumatically, hydraulically or electrically. In this way, by structurally simple means, the gripping lance can reliably grip both the old and the new spout nozzle independently of its precise internal diameter.

Within this context, it is advantageous if the gripping lance is provided with a number of gripper packets arranged one behind the other and which, separated from one another, can adopt different diameters by moving up, each of the gripper packets advantageously being composed of three clamping jaws arranged evenly distributed around the circumference of the gripping lance.

BRIEF DESCRIPTION OF THE DRAWINGS

In the following the invention is described in more detail by means of an exemplary embodiment with reference to the drawings. These show:

FIG. 5 is a detail of the changing apparatus according to FIG. 3 and FIG. 4.

DETAILED DESCRIPTION OF THE INVENTION

Figure 1:
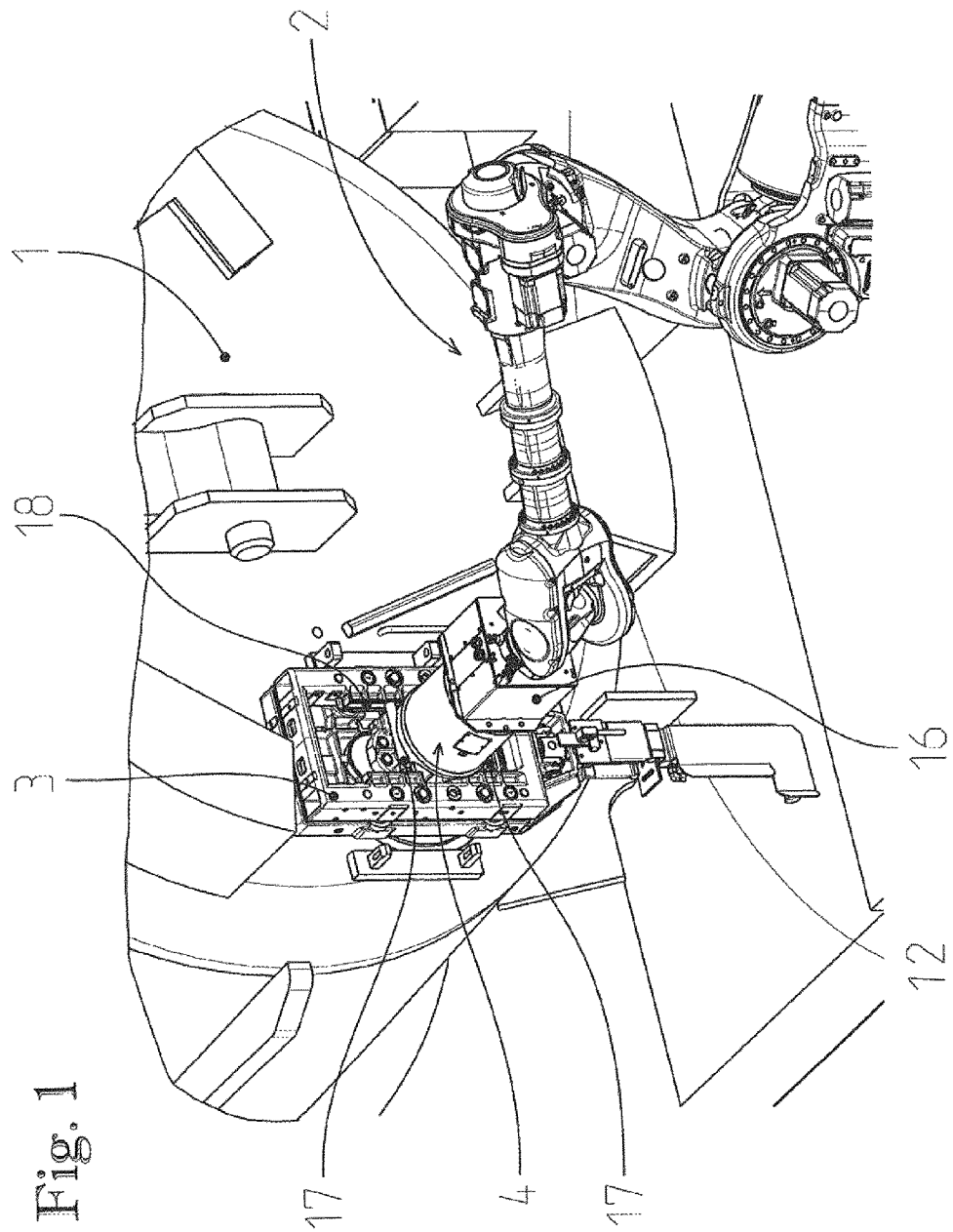
FIG. 1 is a perspectively illustrated maintenance facility for slide closures with an apparatus for automatically replacing the spout nozzle.

FIG. 1 shows a part-region of the maintenance station of a continuous casting plant in which the maintenance and servicing of slide closures on steel ladles or similar vessels is automatically carried out. After emptying, the previously emptied ladles 1 are moved to the maintenance station where a robot 2 manipulates the slide closure of the horizontally positioned ladle according to the programme by means of appropriate tools. In the operating position according to FIG. 1 an apparatus 4 according to the invention for changing the spout nozzle of the slide closure is coupled to the robot 2.

Figure 2:
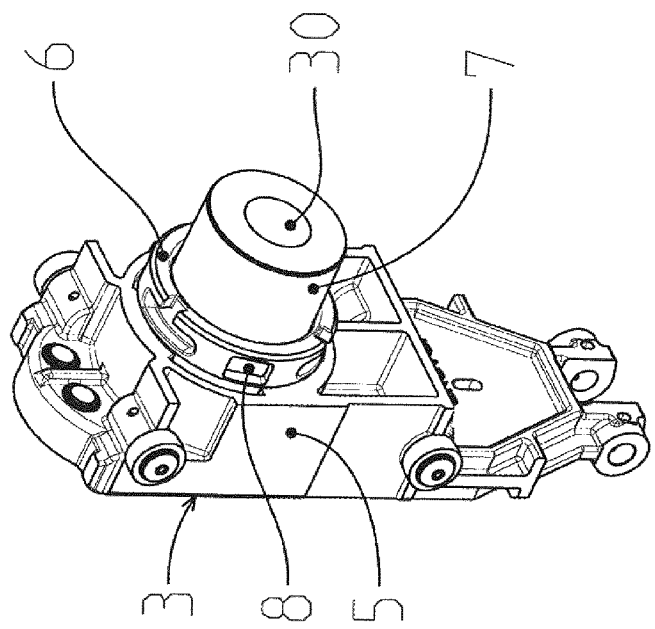
FIG. 2 is a detail of the slide closure according to FIG. 1, shown enlarged.

As is evident from FIG. 2, the slide closure 3 has a slide unit 5 in which a non-visible slide plate and a spout nozzle 7 clamped against the latter is inserted. This spout nozzle is clamped securely by a carrying ring 6 that can be retracted and extended within the slide unit 5. In order to turn the carrying ring 6 it has recesses 8 distributed around the circumference in which gripping elements of the changing apparatus 4 can engage during the changing procedure.

Figure 3:
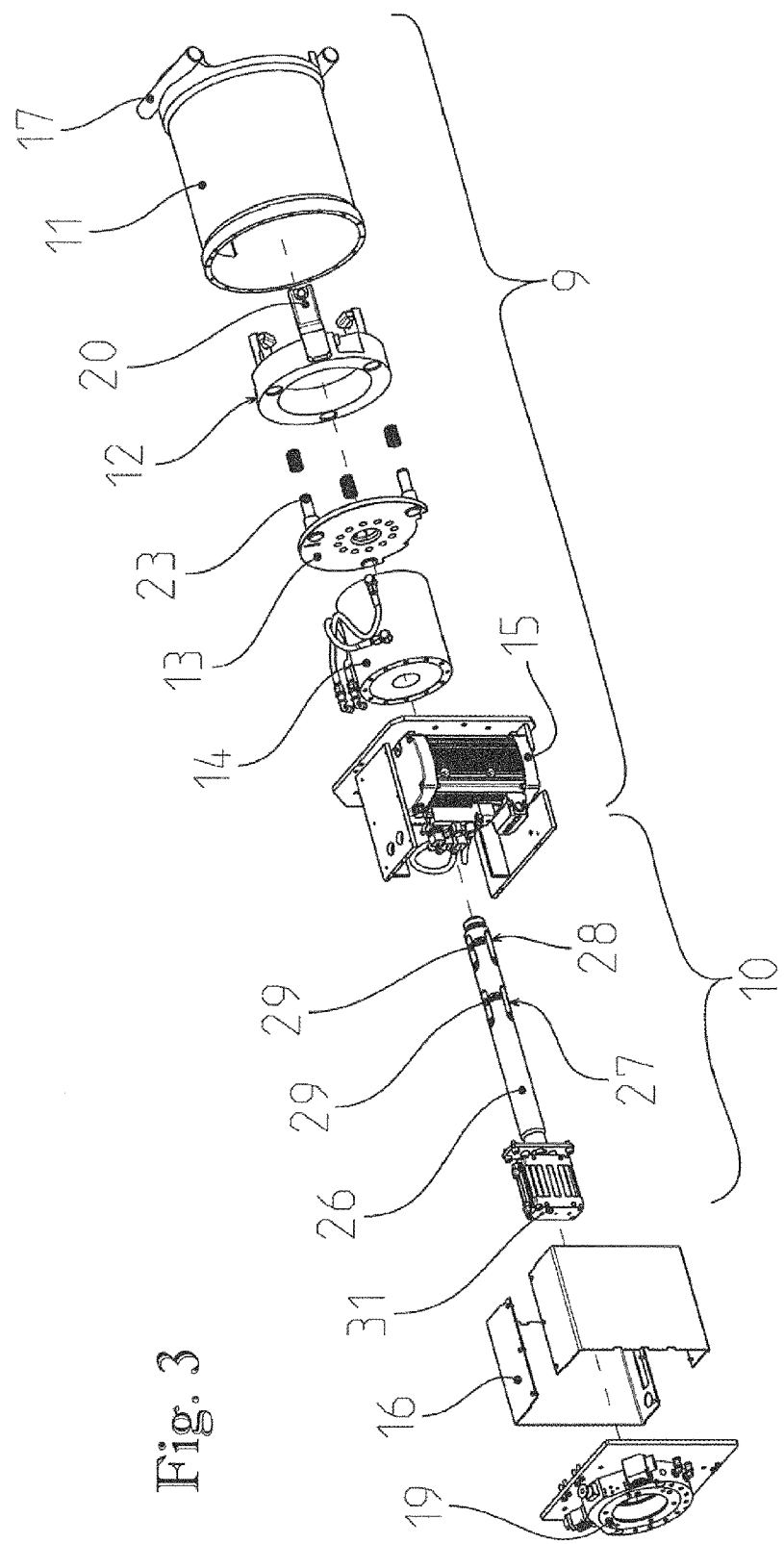
FIG. 3 is an exploded view of the changing apparatus according to FIG. 1.
Figure 4:
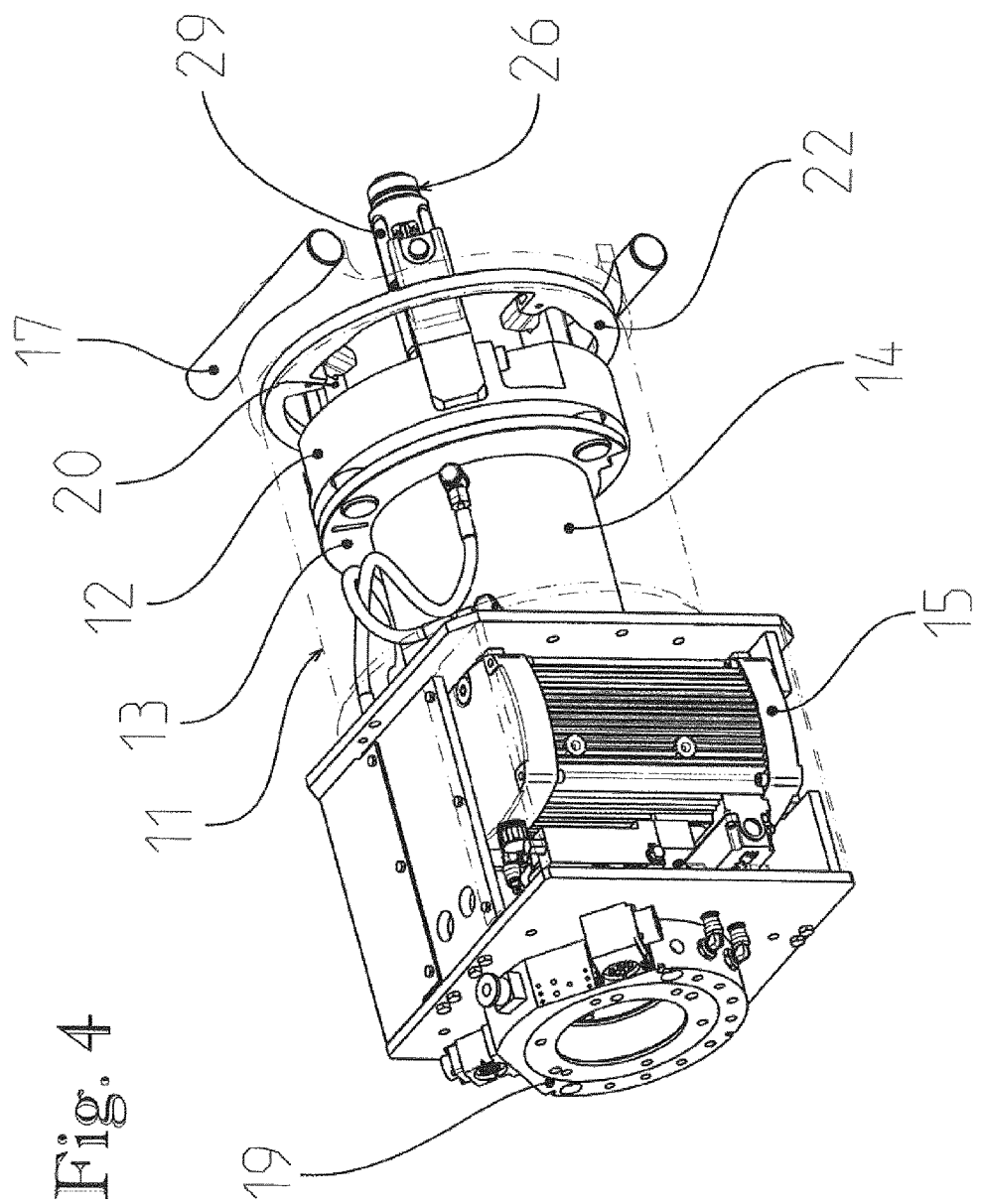
FIG. 4 shows the changing apparatus according to FIG. 2 in the assembled state.

The changing apparatus 4 is composed of a series of components moved into one another (see FIG. 3), which in the assembled state make a compact and space-saving structure possible and on the other hand, simplify the fitting and removal of the individual components for maintenance and repair purposes. These components partially serve as means 10 for fitting and removing the spout nozzle 7 and partially as means 9 for fitting and removing the carrying ring 6. The carrying ring fitting and removing means 9 have a front housing 11 in which a gripping ring 12, an intermediate piece 13 and a hydraulic rotation cylinder 14 are fitted. The hydraulic rotation cylinder 14 is flanged onto a hydraulic unit 15 which, on its part, is fitted in a rear-side housing 16.

The front housing 11 is provided with two torque pickups 17 attached diametrically to one another and which during the changing procedure can be supported against side support strips 18 of the slide closure 3. An adapter 19 for connecting the changing apparatus 4 to the robot 2 of the maintenance device is also attached to the housing 11.

The changing apparatus 4 is preferably aligned parallel to the axis of the robot 2. In this way, any play between the torque pickups 17 and the side support strips 18 can be compensated and so no forces act on the robot 2 due to the turning of the carrying ring 6.

The gripping ring 12 has three carrying ring catches 20 arranged distributed around the circumference which during the changing procedure can be engaged in the recesses 8 of the carrying ring 6. For this purpose they are pre-stressed with springs 21. On the other hand, their degree of freedom is restricted by appendages of a stop ring 22 surrounding the latter and which can not be turned relative to the gripping ring 12. The hydraulic rotation cylinder 14 on its part serves to turn the gripping ring 12 in the respectively desired direction of rotation during the changing procedure.

The gripping ring 12 is coupled to the rotation cylinder 14 by means of the intermediate piece 13 fastened to the latter and that has three driving pins 23 also serving as depth compensators which are guided resiliently in corresponding receivers 24 of the gripping ring 12. The hydraulic unit 15 located in the rear housing 16 is used to actuate the rotation cylinder 14. The torque pickups 17 in the front housing 11 on their part ensure that the torque generated by the rotation cylinder 14 is fully effective upon the carrying ring catches 20 of the gripping ring 12.

Serving as means 10 for fitting and removing the spout nozzle 7 is a gripping lance 26 guided through the rotation cylinder 14 in which two gripper packets 27, 28 arranged one behind the other on the front side are fitted. The latter are respectively provided with three clamping jaws 29 distributed around the circumference and which can adopt different diameters and reach into the casting channel 30 of the changed spout during the changing procedure. An axially displaceable actuation rod for spreading out or drawing in the clamping jaws 29 is fitted in the gripping lance 26. A pneumatic cylinder 31 fastened to the rotation cylinder 14 serves to actuate the rod.

The mode of operation of the changing apparatus according to the invention is as follows:

The changing apparatus 4 coupled to the robot 2 will first of all encompass the carrying ring 6 at the carrying ring catch 20, while the gripping lance 26 reaches into the casting channel 30 of the spout nozzle 7 to be replaced.

Next, the gripping ring 12 is turned with the rotation cylinder 14 such that the catches 20 leave the appendages of the stop ring 22 behind, engage in the recesses 8 of the carrying ring 6 and entrain the carrying ring 6 until the carrying ring 6 is released from its counter-piece in the slide unit 5.

Parallel to this, the gripper packets 27, 28 of the gripping lance 26 are swiveled out and hold the spout nozzle 7 securely while the robot 2 moves back the changing apparatus 4 and deposits the carrying ring 6 and the old spout nozzle 7, one after the other, in a repository or a waste container.

After this, the robot 2 cleans the support for the new spout nozzle on the slide plate if the latter slide plate has not previously been replaced. Next, the robot 2 fetches a new spout nozzle from the replacement part stock with the gripping lance 26 and brings the new spout nozzle to a cementing station of the device where the new spout nozzle is cemented with the aid of appropriate tools, this being able to be implemented by the robot u2 or manually. Next, the robot 2 fetches with the gripping ring 12 the carrying ring 6 which has in the meantime been deposited and brings the carrying ring 6 together with the new spout nozzle 7 into the original starting position with respect to the slide unit 5 in which the carrying ring catches 20 encompass the carrying ring 6 while the gripping lance 26 holds the new spout nozzle 7 securely in an installation position in which its casting channel 30 is flush with that of its opposite slide plate. It is advantageous if the gripping ring 12 is mounted resiliently so that any axial tolerances and different cement thicknesses can be evened out.

The carrying ring 6 is now turned further with the carrying ring catches 20 of the gripping ring 12 with a precisely defined torque, the result being that the new spout nozzle 7 is clamped against the slide plate with a likewise precisely defined tension force independently of any dimensional tolerances. The torque pickups 17 of the front housing 11 ensure here that the gripping ring 12 totally transmits the torque generated by the rotation cylinder 14 to the carrying ring 6. Next, the carrying ring catches 20 and the gripping lance 26 are released again, and the robot 2 is moved back into its waiting position.

The changing apparatus according to the invention is characterized by a compact structure with robust components which are easy to maintain and even during rough operation guarantee the operational reliability of the changing apparatus.

Moreover, it is an advantage of the changing apparatus 4 according to the invention that the robot 2, as described above, manipulates the carrying ring 6 and the spout nozzle 7 independently of one another. This makes it possible to optimize the sequence of tasks to be performed respectively by the robot 2.

Instead of a robot 2, just an auxiliary apparatus, in which this changing apparatus with this auxiliary apparatus could be coupled manually to the slide closure, could also be provided as a device for manipulating the changing apparatus 4.

The invention claimed is:
1. A method for turning a carrying ring with a defined torque to selectively cause a spout nozzle to be clamped by the carrying ring against a slide plate or slide unit or cause the spout nozzle to be released from clamping by the carrying ring against the slide plate or slide unit, the method comprising:
    engaging carrying ring catches of a gripping ring in recesses of the carrying ring; and turning the gripping ring using a rotation cylinder while the carrying ring catches are engaged in the recesses of the carrying ring to thus cause turning of the carrying ring, whereby the turning of the carrying ring causes either the clamping by the carrying ring of the spout nozzle against the slide plate or slide unit or releasing of the spout nozzle from clamping by the carrying ring against the slide plate or slide unit.

2. The method of claim 1, further comprising:

operating a robot coupled to the gripping ring and the rotation cylinder to release an existing spout nozzle from clamping by the carrying ring against the slide plate or slide unit; and then operating the robot to clamp a new spout nozzle against the slide plate or slide unit by means of the carrying ring.

3. The method of claim 2, further comprising:

engaging a gripping lance having a plurality of grippers with the spout nozzle; and moving the spout nozzle, using the gripping lance while engaged with the spout nozzle, relative to the slide plate or slide unit against which the spout nozzle is clamped to either cause the spout nozzle to be in a position to be clamped against the slide plate or slide unit by the carrying ring or removed from the position in which it is clampable against the slide plate or slide unit.

4. The method of claim 3, wherein the gripping lance is coupled to the robot, further comprising:

configuring the robot to independently control the turning of the gripping ring by the rotation cylinder to cause the turning of the carrying ring and the moving of the spout nozzle by the gripping lance.

5. An apparatus for implementing the method of claim 1, the apparatus comprising means for fitting and removing the carrying ring which comprise the gripping ring with carrying ring catches and the rotation cylinder that turns the gripping ring.

6. The apparatus of claim 5, wherein the rotation cylinder is a hydraulic rotation cylinder.

7. The method of claim 1, further comprising configuring a robot to independently manipulate movement of the spout nozzle into and out of a clamping position against the slide plate or slide unit and turning of the carrying ring by the gripping ring.

8. The method of claim 1, further comprising:

controlling a robot coupled to the gripping ring to cause the turning of the gripping ring while the carrying ring catches of the gripping ring are engaged in the recesses of the carrying ring to cause the turning of the carrying ring and release of the carrying ring from a position in which the carrying ring clamps the spout nozzle against the slide plate or slide unit; then controlling the robot to deposit the released carrying ring in a repository;

operating the robot to remove an existing spout nozzle from a position against the slide plate or slide unit after the carrying ring is released from the position in which the carrying ring clamps the spout nozzle against the slide plate or slide unit; then operating the robot to retrieve a new spout nozzle from a stock of replacement parts and position the new spout nozzle against the slide plate or slide unit; and then controlling the robot to cause turning of the gripping ring while the carrying ring catches of the gripping ring are engaged in the recesses of the carrying ring to cause turning of the carrying ring into a position in which the carrying ring clamps the new spout nozzle against the slide plate or slide unit.

9. The method of claim 1, wherein the step of engaging the carrying ring catches of the gripping ring in recesses of the carrying ring comprises entraining the carrying ring catches in the recesses of the carrying ring, the gripping ring being turned using the rotation cylinder to cause the turning of the carrying ring until the carrying ring is released from a counterpiece in the slide unit.

10. The method of claim 1, wherein the step of engaging the carrying ring catches of the gripping ring in recesses of the carrying ring comprises entraining the carrying ring catches in the recesses of the carrying ring, the gripping ring being turned using the rotation cylinder to cause the turning of the carrying ring until the carrying ring is fitted against the slide unit.

11. A method for manipulating a spout nozzle of a slide closure that is clamped by a carrying ring against a slide plate or slide unit, the method comprising:

engaging a gripping lance having a plurality of grippers with the spout nozzle; and moving the spout nozzle, while the gripping lance is engaged with the spout nozzle, relative to a slide plate or slide unit to either cause the spout nozzle to be in a position to be clamped by the carrying ring against the slide plate or slide unit or released from clamping against the slide plate or slide unit.

12. The method of claim 11, wherein the step of engaging the gripping lance with the spout nozzle comprises extending the grippers from a position in which the grippers do not engage with the spout nozzle to a position in which the grippers engage with the spout nozzle.

13. The method of claim 11, further comprising disengaging the spout nozzle from the gripping lance after the spout nozzle has been moved by retracting the grippers from a position in which the grippers engage with the spout nozzle to a position in which the grippers do not engage with the spout nozzle.

14. The method of claim 11, wherein the grippers are arranged in sets that are situated one behind the other.

15. The method of claim 11, wherein the grippers are gripper packets that clamp spout nozzles with different inside diameters.

16. The method of claim 11, wherein the grippers each comprise three clamping jaws distributed around a circumference of the gripping lance.

\* \* \* \* \*